US012565255B2

(12) United States Patent
Liu

(10) Patent No.: US 12,565,255 B2
(45) Date of Patent: Mar. 3, 2026

(54) STROLLER FRAME HAVING A PUSH-PULL FUNCTION

(71) Applicant: SUNNYLOVE BABY PRODUCTS ZHUHAI CO., LTD., Zhuhai City (CN)

(72) Inventor: Xiu Ping Liu, Zhuhai City (CN)

(73) Assignee: SUNNYLOVE BABY PRODUCTS ZHUHAI CO., LTD., Zhuhai City (CN)

( * ) Notice: Subject to any disclaimer, the term of this patent is extended or adjusted under 35 U.S.C. 154(b) by 305 days.

(21) Appl. No.: 18/327,980

(22) Filed: Jun. 2, 2023

(65) Prior Publication Data

US 2024/0075977 A1    Mar. 7, 2024

(30) Foreign Application Priority Data

Sep. 2, 2022    (CN) .......................... 202222343967.2
Sep. 2, 2022    (CN) .......................... 202222343988.4

(51) Int. Cl.
| | |
|---|---|
| B62B 9/20 | (2006.01) |
| B62B 3/00 | (2006.01) |
| B62B 5/06 | (2006.01) |
| B62B 7/06 | (2006.01) |
| B62B 7/10 | (2006.01) |
| B62B 7/14 | (2006.01) |

(52) U.S. Cl.
CPC .............. B62B 9/203 (2013.01); B62B 3/007 (2013.01); B62B 7/062 (2013.01); B62B 7/068 (2013.01); B62B 7/10 (2013.01); B62B 7/14 (2013.01); *B62B 5/067* (2013.01)

(58) Field of Classification Search
CPC ......... B62B 3/007; B62B 5/067; B62B 5/065; B62B 9/203
See application file for complete search history.

(56) References Cited

U.S. PATENT DOCUMENTS

| | | | | |
|---|---|---|---|---|
| 10,252,738 B2 * | 4/2019 | Diep | ....................... | B62B 9/203 |
| 10,286,940 B2 * | 5/2019 | Chen | ....................... | B62B 7/08 |
| 10,532,759 B2 * | 1/2020 | Li | ...................... | B62B 9/24 |
| 11,001,289 B2 * | 5/2021 | Gibson | .................. | B62B 7/008 |
| 11,472,461 B2 * | 10/2022 | Mendoza | ............... | B62B 1/008 |

(Continued)

FOREIGN PATENT DOCUMENTS

| | | | | | |
|---|---|---|---|---|---|
| CN | 119160267 A | * | 12/2024 | ............... | B62B 9/26 |
| ES | 1050676 U | * | 5/2002 | ........... | B60B 15/263 |

*Primary Examiner* — Emma K Frick
(74) *Attorney, Agent, or Firm* — Che-Yang Chen

(57) ABSTRACT

A stroller frame has a push-pull function consisting of a lower supporting frame and an upper frame connected through a frame joint. The lower supporting frame comprises a front leg connected to a front wheel set and a rear leg connected to a rear wheel set. The lower portion of the front leg is pivotally attached to a pull rod assembly located at the front of the stroller frame. In addition, a push rod assembly is connected to the lower supporting frame and extends diagonally toward the rear of the stroller frame to allow the user to push the stroller frame in a raised position while walking, which facilitates pulling or pushing the stroller frame as desired while also allowing interaction with the child riding on the upper frame. The stroller frame is characterized by its ease of use and versatile functionality.

3 Claims, 15 Drawing Sheets

(56) References Cited

U.S. PATENT DOCUMENTS

| | | | | |
|---|---|---|---|---|
| 11,472,462 | B1 * | 10/2022 | Choi | B62B 7/105 |
| 12,128,944 | B2 * | 10/2024 | Chen | B62B 7/064 |
| 2023/0415806 | A1 * | 12/2023 | Cui | B62B 7/008 |
| 2025/0229817 | A1 * | 7/2025 | Ercanbrack | B62B 5/067 |

* cited by examiner

STROLLER FRAME HAVING A PUSH-PULL FUNCTION

FIELD OF THE INVENTION

The present invention relates to a stroller frame having a push-pull function.

BACKGROUND OF THE INVENTION

Currently, baby strollers available in the market typically consist of a lower supporting frame and an upper frame positioned on top of it. A push handle is located at the rear of the lower supporting frame, allowing the user to operate it for pushing the frame. However, this frame design presents several issues: for instance, in strollers where the upper frame can accommodate multiple children, the user, standing behind the frame and operating the push handle, faces a considerable distance from the children seated on the front side of the upper frame. This gap hampers effective communication and interaction between the user and the children. Whenever the user needs to engage with the children, they need leave the rear side of the frame and position themselves on the front side. Unfortunately, operating the frame while standing in front of it proves to be inconvenient.

Furthermore, to cater to user convenience and preferences, some strollers available in the market adopt an upper push configuration and a lower pull configuration where the user can either push or pull the stroller. To achieve this dual functionality, these strollers typically incorporate a push rod assembly at the rear for pushing and a pull rod assembly at the front for pulling, particularly in a lower position. However, this configuration results in a complex and expensive stroller structure, which also occupies a significant amount of space when folded.

To address the afore-mentioned challenges, the present invention has been developed and proposed. Its aim is to provide solutions to the issues outlined above.

SUMMARY OF THE INVENTION

The purpose of the present invention is to overcome the shortcomings of the prior art and provide a stroller frame having a push-pull function, capable of pulling and/or pushing the stroller frame to walk according to the user's needs, while facilitating communication and interaction between the user and the child riding on the front or rear side of the upper frame, featuring ease of use, simple structure, and small folding volume.

In order to solve the above technical problems, the present invention provides a stroller frame having a push-pull function, comprising an upper frame, a lower supporting frame and a push rod assembly, the lower supporting frame and the upper frame being connected to each other through a frame joint; the lower supporting frame comprising a front leg for connecting the front wheel set and a rear leg for connecting the rear wheel set, the lower portion of the front leg being pivotally attached to a pull rod assembly located at the front of the stroller frame for the user to pull the stroller frame for walking and being foldable or telescopically adjustable; in addition, the push rod assembly is connected to the lower supporting frame and extends diagonally toward the rear of the stroller frame to allow the user to push the stroller frame in a raised position while walking, which can facilitate the user to pull or push the stroller frame for walking and also facilitate two users for operation at the same time, i.e., which facilitates the user to communicate and interact with the child riding on the upper frame, increase the user's enjoyment, and with the features of various operations, easy use, simple structure, and folded small volume.

The pull rod assembly is pivotally connected to the front leg near the front wheel set. The pull rod assembly includes a lower pull rod pivotally connected to the front leg at a lower end and capable of rotating to unfold or rotating to fold with respect to the front leg, and an upper pull rod pivotally connected to the upper end of the lower pull rod and capable of rotating to unfold or rotating to fold with respect to the lower pull rod.

Between the lower end of the lower pull rod and the front leg bar, a resilient restoration member is provided that allows the lower pull rod to rotate and fold relative to the front leg when the external force of the lower pull rod is withdrawn, and/or between the lower end of the upper pull rod and the upper end of the lower pull rod, a resilient restoration member is provided that allows the upper pull rod to rotate and fold relative to the lower pull rod when the external force of the upper pull rod is withdrawn.

The pull rod assembly comprises a lower pull rod that is pivotally connected to the front leg at a lower end and capable of rotating to unfold or rotating to fold with respect to the front leg, and an upper pull rod that is telescopically adjustable and connected to the lower pull rod.

The front leg bar is provided with a pull rod locking structure for locking the pull rod assembly relative to the front leg when the pull rod assembly is in a folded state. The pull rod locking structure includes a locking hook resiliently attached to the front leg for hooking the pull rod assembly in the folded state.

The pull rod assembly and/or the push rod assembly is U-shaped.

The lower end of the push rod assembly is fixedly connected relative to the rear end of the front leg.

The rear side of the lower supporting frame is rotatably connected to a storage rack that can be rotated to unfold or rotated to fold relative to the rear leg and used to store items.

The storage rack comprises a U-shaped storage rod, the two connecting ends of the storage rod are provided with a storage linkage between the storage rod and the lower supporting frame, the upper end of the storage linkage is rotatably connected to the lower supporting frame, the lower end of the storage linkage is rotatably connected to the connecting end of the storage rod, the rear part of the storage rod is provided with a support linkage, and the lower end of the support linkage is connected to a roller set.

The present invention also provides a stroller frame having a push-pull function, comprising an upper frame, a lower supporting frame, and a push/pull rod assembly, wherein the lower supporting frame and the upper frame are connected to each other through a frame joint; the lower supporting frame comprises a front leg for connecting the front wheel set and a rear leg for connecting the rear wheel set, the front leg is provided with a front leg sliding member capable of sliding along the front leg, and an unlock/lock mechanism is provided between the front leg sliding member and the front leg for locking the front leg sliding member relative to the front leg and/or unlocking the locked state of the front leg sliding member; by rotatably connecting the push/pull rod assembly and the front leg sliding member, which enables the push/pull rod assembly to rotate backward or forward relative to the stroller frame, thereby enabling the push/pull rod assembly to be switched between the upper push configuration and the lower pull configuration for use, characterized by ease of use, simple structure, small folding volume, and various functions; in addition, because the push/pull rod assembly is rotatably connected to the front leg sliding member, the front leg sliding member is slidably adjustable on the front leg, and during adjustment, the user operates the push/pull rod assembly to act on the front leg sliding member to slide along the front leg to the side of the front wheel set or to the side away from the front wheel set so as to adjust the height of the push/pull rod assembly relative to the stroller frame to match the height of different users, thereby facilitating the user's operation of the push/pull rod assembly and improving the comfort of operation.

The front leg sliding member is a front leg sliding sleeve on the front leg; the front leg sliding member is rotatably connected to the push/pull rod assembly through a push rod joint, which includes a first joint block on the front leg sliding member and a second joint block on the push/pull rod assembly that is rotatably connected to the first joint block.

A damping member or a joint locking structure is provided between the first joint block and the second joint block that prevents the push/pull rod assembly from rotating relative to the front leg sliding member.

The unlock/lock mechanism comprises a plurality of locking holes spaced apart on the front leg and a locking block slidably disposed in the first joint block having a locking end penetrating the front leg sliding member and capable of being inserted into the corresponding locking hole to lock the front leg sliding member, with a locking resilient member between the locking block and the first joint block capable of retaining the locking end of the locking block in the locking hole; the unlock/lock mechanism also comprises an unlocking member movably disposed on the push/pull rod assembly and an unlocking slider slidably disposed in the second joint block and connected to the unlocking member by an unlocking cord, the unlocking slider being provided with an unlocking ramp for driving the locking end of the locking block out of the locking hole when the unlocking slider slides relative to the first joint block to release the locking state of the front leg sliding member.

A push rod locking mechanism is provided on the front leg for releasably locking the push/pull rod assembly in the upper push configuration. The push rod locking mechanism comprises a push rod locking seat disposed on the front leg and having a push rod locking slot for the push/pull rod assembly to snap into when the push/pull rod assembly is in the upper push configuration.

The push rod locking mechanism also includes a T-shaped slider disposed on the push/pull rod assembly and a T-shaped groove disposed on the push rod locking seat and located on the inside of the push rod locking slot, the T-shaped groove sliding with the T-shaped slider and the T-shaped slider exiting the T-shaped slot when the front leg sliding member slides to the side of the front leg near the front wheel set.

The push rod locking mechanism includes the push rod locking seat disposed on the front leg; the push rod locking mechanism comprises a T-shaped slider disposed on the push/pull rod assembly and a T-shaped groove disposed on the push rod locking seat and used to slide with the T-shaped slider, and the T-shaped slider exits the T-shaped groove when the front leg sliding member slides to the side of the front leg near the front wheel set.

The push/pull rod assembly comprises a lower push rod fixedly connected to the second joint block at the lower end and an upper push rod rotatably connected to the upper end of the lower push rod and capable of rotatably unfolding or folding with respect to the lower push rod, a push rod locking structure being provided between the upper push rod and the lower push rod for locking the upper push rod relative to the lower push rod when the upper push rod is in the unfolded state. When the upper push rod is rotated and folded relative to the lower push rod, the upper push rod is rotated and folded relative to the stroller frame forward to the side of the lower push rod around the axis of rotation located between the lower end of the upper push rod and the upper end of the lower push rod.

BRIEF DESCRIPTION OF THE DRAWINGS

Specific embodiments of the present invention are described in further detail below in conjunction with the accompanying drawings, wherein.

DESCRIPTION OF THE PREFERRED EMBODIMENTS

The embodiments of the present invention are described in detail below in conjunction with the accompanying FIGS. 1-15.

Embodiment 1

Figure 1:
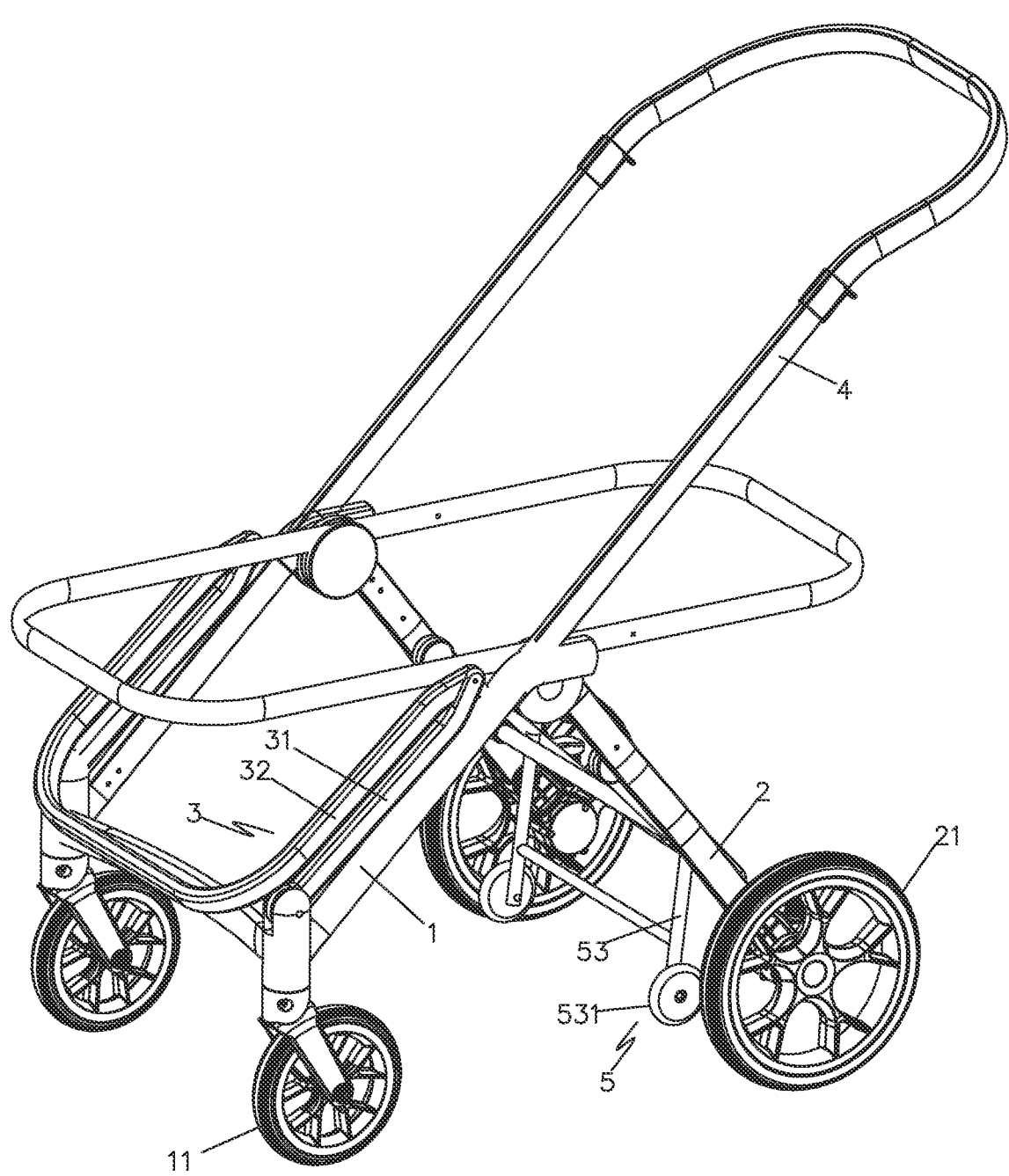
FIG. 1 is a three-dimensional view of the pull rod assembly of Embodiment 1 in a folded state.
Figure 2:
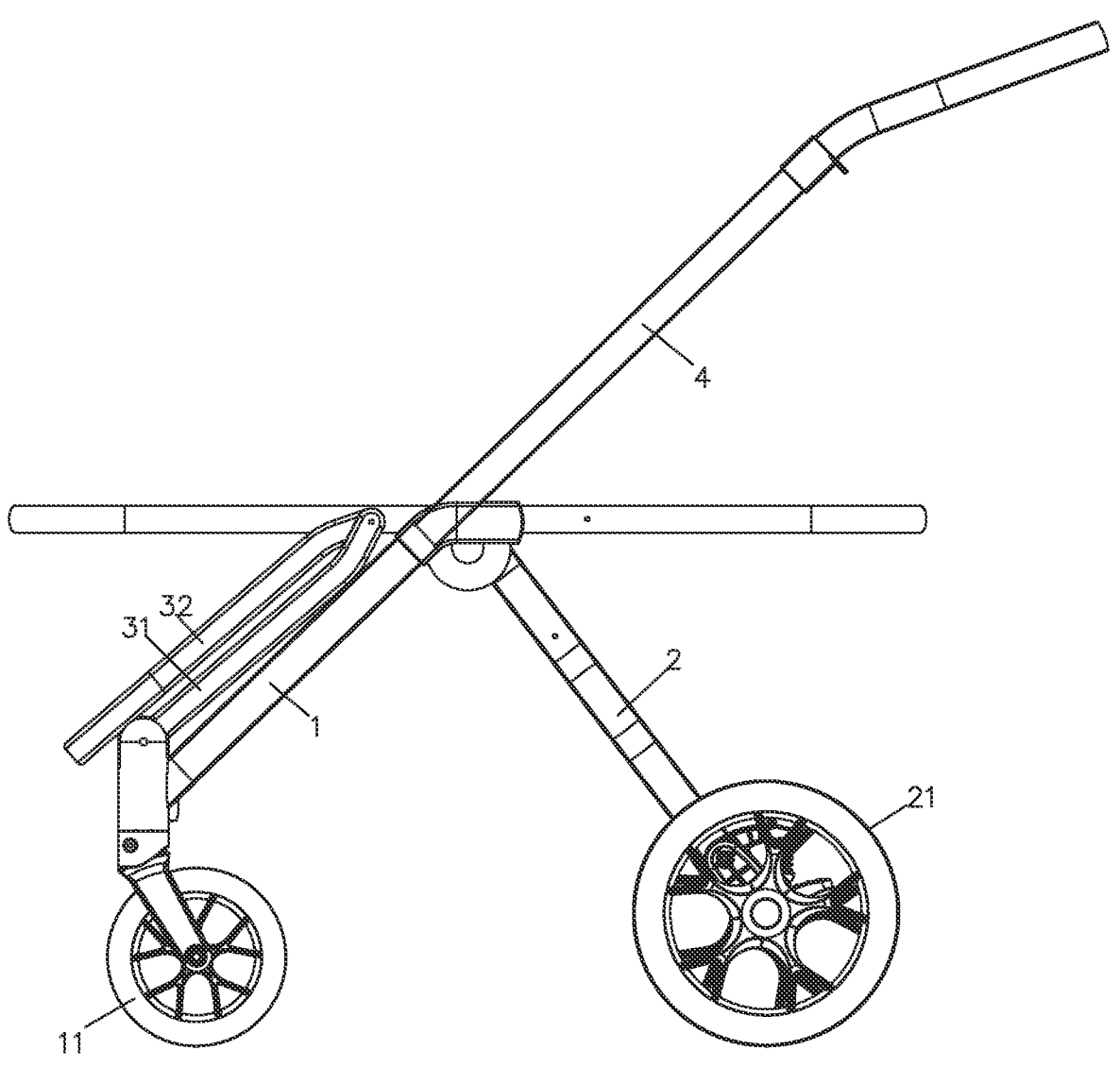
FIG. 2 is a side view of the pull rod assembly of Embodiment 1 in the folded state.
Figure 3:
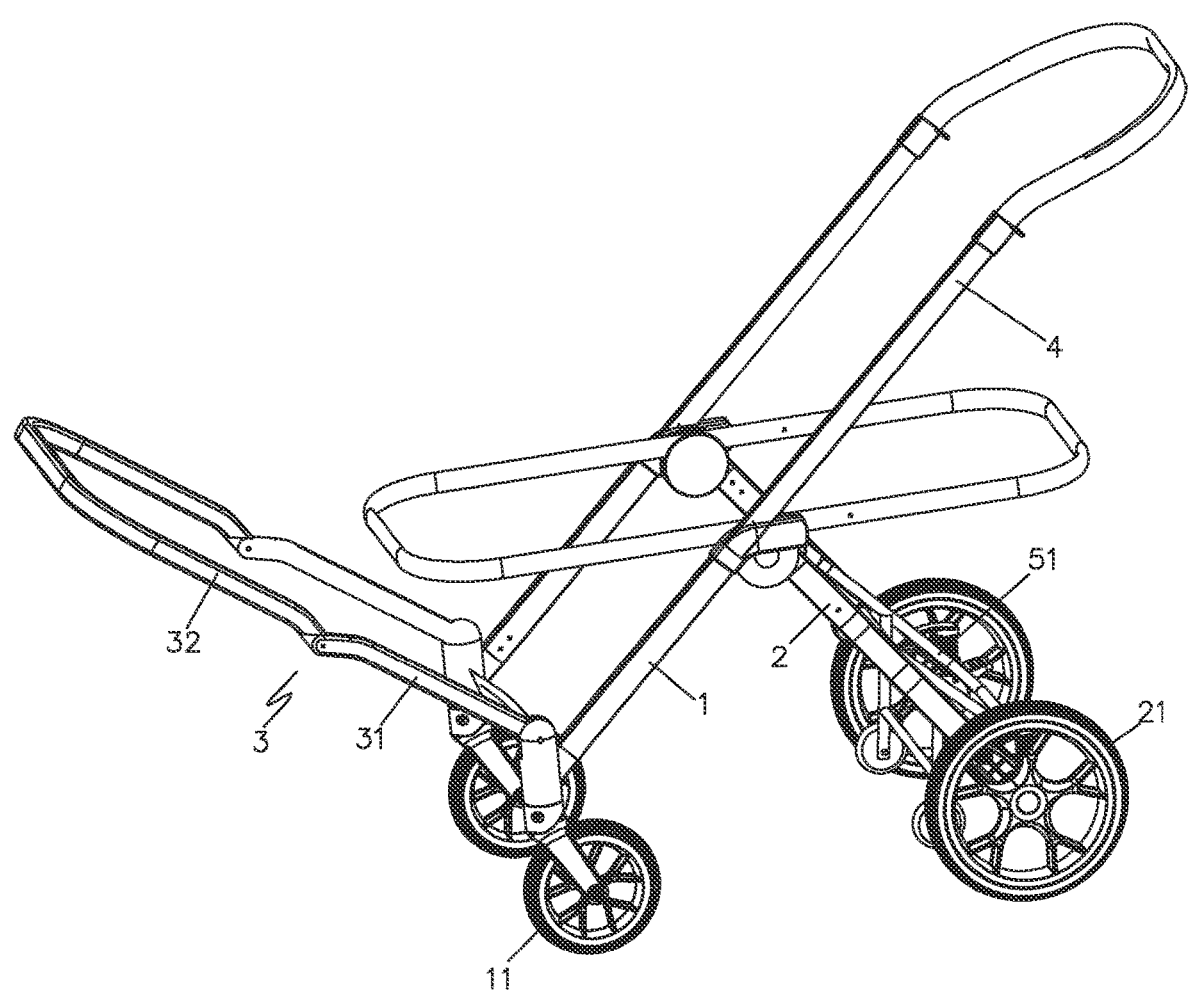
FIG. 3 is a first three-dimensional view of the pull rod assembly of Embodiment 1 in an unfolded state.

As shown in FIGS. 1-6, a stroller frame having a push-pull function comprises a lower supporting frame and an upper frame connected to each other through a frame joint, the lower supporting frame having a front leg 1 for connecting the front wheel set 11 and a rear leg 2 for connecting the rear wheel set 21, the lower portion of the front leg 1 being pivotally attached to a pull rod assembly 3 located at the front of the stroller frame for a user to pull the stroller frame for walking and being foldable or telescopically adjustable; in addition, the push rod assembly 4 is connected to the lower supporting frame and extends diagonally toward the rear of the stroller frame to allow the user to push the stroller frame in a raised position while walking. This embodiment is easy to use and has a variety of functions by providing the pull rod assembly for the user to pull and the push rod assembly for the user to push in the raised position, so that the user can pull and/or push the stroller frame according to his or her needs, and it is convenient for the user to communicate and interact with the child riding on the upper frame; as shown in FIG. 3, it is also convenient for two users to operate at the same time, i.e., one pushing the push rod assembly and the other pulling the push rod assembly, in order to achieve a variety of operation and increase the user's enjoyment.

As shown in FIGS. 1-6, the pull rod assembly 3 is pivotally connected to the front leg 1 near the front wheel set 11. In this embodiment, compared to the prior art solution of pivoting the pull rod assembly 3 to the front leg 1 away from the front wheel set 11, the prior art solution is likely to cause the stroller frame to tip over due to the unstable center of gravity of the stroller frame when the user operates the pull rod assembly 3 to pull the stroller frame, so that it is a safety concern in use. Therefore, in the present embodiment, the pull rod assembly 3 is pivoted to the front leg 1 near the front wheel set 11, which can avoid the unstable center of gravity of the stroller frame in the process of pulling, which has the characteristics of safety and reliability.

As shown in FIGS. 3-6, the pull rod assembly 3 comprises a lower pull rod 31 pivoted to the front leg 1 and capable of rotating to unfold or rotating to fold with respect to the front leg 1, and an upper pull rod 32 pivoted to the upper end of the lower pull rod 31 and capable of rotating to unfold or rotating to fold with respect to the lower pull rod 31, which can make the overall volume of the stroller frame smaller in the folded state and convenient for storage, transportation and removal.

Between the lower end of the lower pull rod 31 and the front leg 1, a resilient restoration member is provided that can make the lower pull rod 31 rotate to fold relative to the front leg 1 when the external force of the lower pull rod 31 is withdrawn, and/or between the lower end of the upper pull rod 32 and the upper end of the lower pull rod 31, a resilient restoration member is provided that can make the upper pull rod 32 rotate to fold relative to the lower pull rod 31 when the external force of the upper pull rod 32 is withdrawn, wherein the resilient restoration member can be a torsion spring. The structure design of above can make the pull rod assembly to realize an automatically folding effect in the absence of external force or to achieve the auxiliary folding effect to improve the convenience of folding, also to prevent the pull rod assembly from automatically rotating to unfold in the absence of external force; in addition, the resilient restoration member can also make the pull rod assembly to maintain a stable folded state relative to the front leg.

In some other embodiments of the pull rod assembly 3, the pull rod assembly 3 comprises a lower pull rod 31 which is pivotally connected to the front leg 1 at the lower end and can be rotated to unfold or rotated to fold relative to the front leg 1, and an upper pull rod 32 which is telescopically adjustable and connected to the lower pull rod 31. In this embodiment, by adjusting the upper pull rod 32 to extend or retract relative to the lower pull rod 31, the length of the pull rod assembly 3 can be adjusted to meet the different height of the user who pulls the pull rod assembly 3, to avoid the pull rod assembly being too short or too long, which cause the inconvenience problems of the user who has to bend over or lift the hands accordingly to operate.

The front leg 1 is provided with a pull rod locking structure for locking the pull rod assembly 3 relative to the front leg 1 when the pull rod assembly 3 is in the folded state, to make the pull rod assembly more stable in the folded state relative to the front leg and to prevent the pull rod assembly from automatically rotating to unfold. The pull rod locking structure comprises a locking hook which is resiliently attached to the front leg 1 and is used to hook the pull rod assembly 3 when it is in the folded state, which is not shown in the figures. In the locking position, the user first rotates the folded pull rod assembly to close to the front leg 1 and then operates the locking hook to hook the upper pull rod 32, which is easy to operate. Because the locking hook of this embodiment is resiliently attached to the front leg 11, the locking hook can be more securely attached to the upper pull rod 32, thereby avoiding the problem of the locking hook being too short to hook the upper pull rod 32 or too long to securely hook the upper pull rod.

Figure 4:
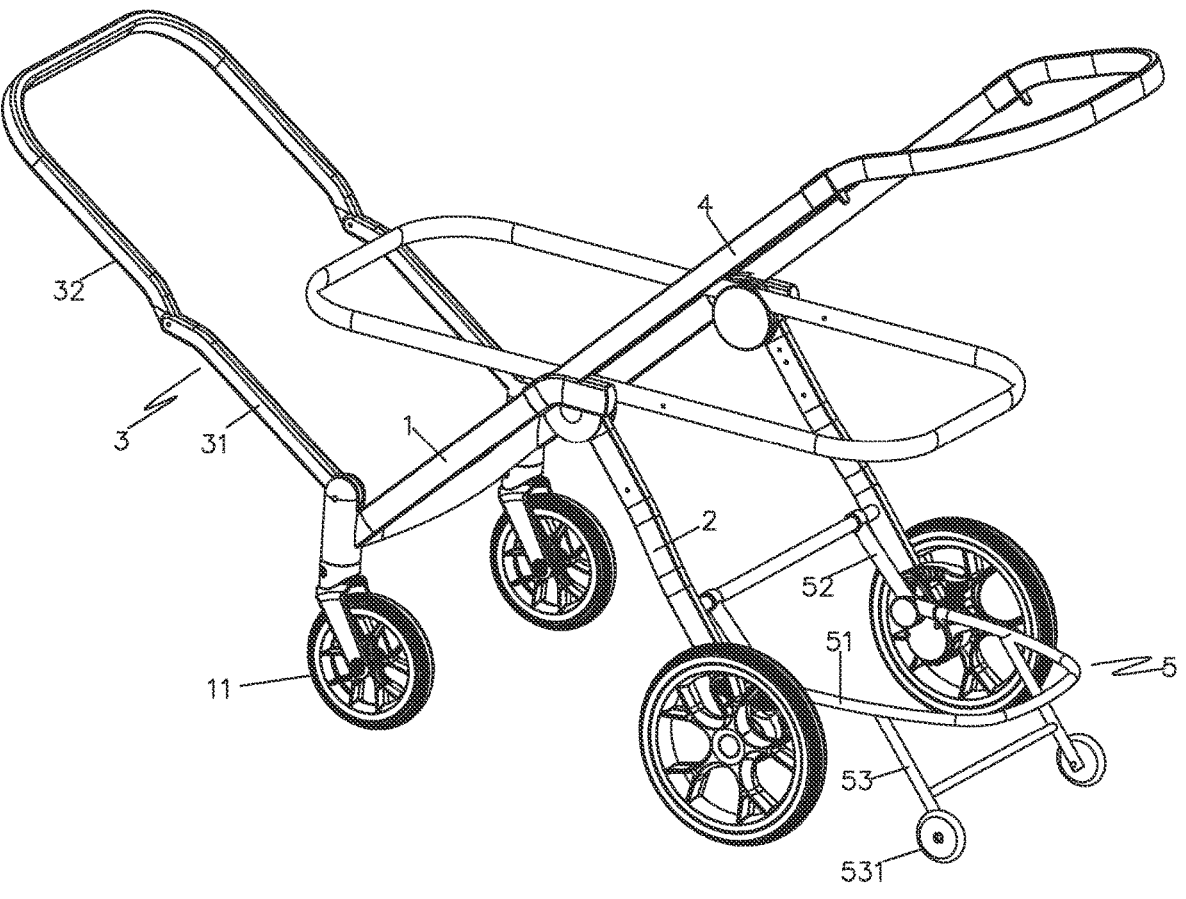
FIG. 4 is a second three-dimensional view of the pull rod assembly of Embodiment 1 in the unfolded state.

As shown in FIGS. 3 and 4, the pull rod assembly 3 and/or the push rod assembly 4 have a U-shaped structure for convenient operation by the user. The lower end of the push rod assembly 4 is fixedly connected to the rear end of the front leg 1, i.e., the lower end of the push rod assembly 4 and the rear end of the front leg 1 are in a one-piece molded integral structure, making the connection more reliable.

Figure 5:
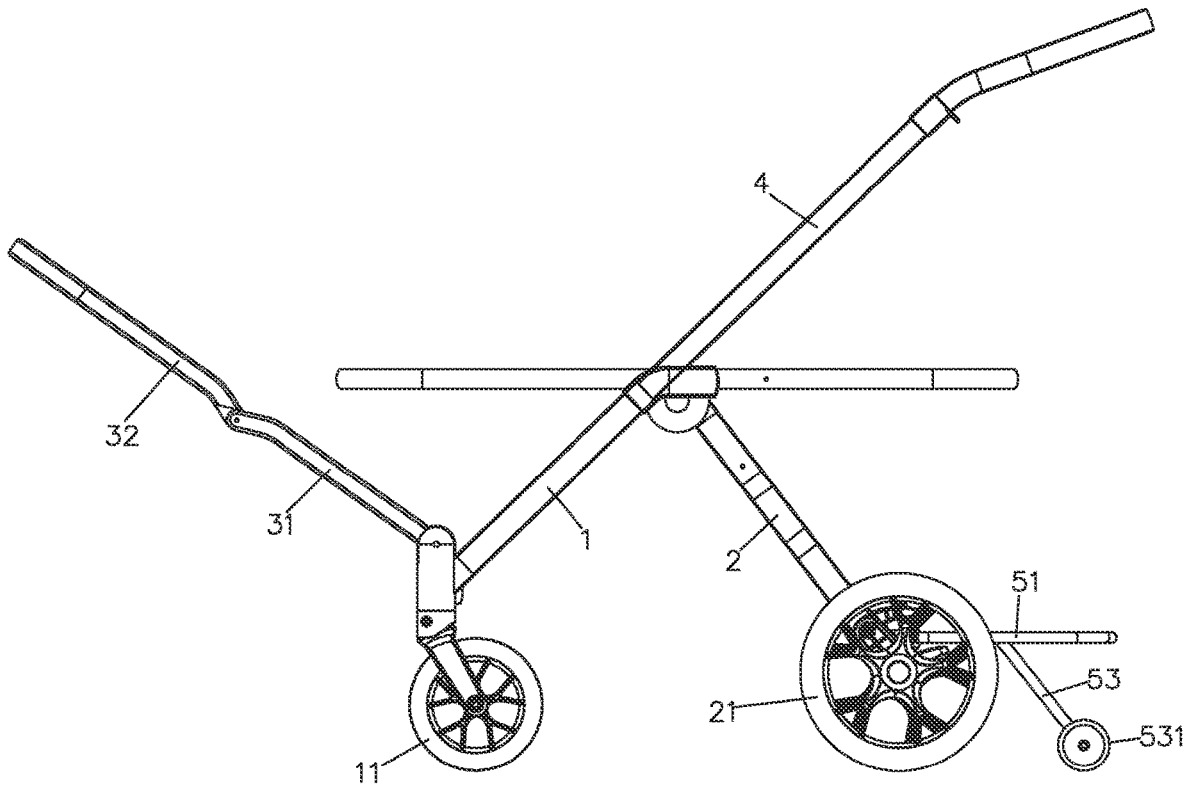
FIG. 5 is a side view of the pull rod assembly of Embodiment 1 in the unfolded state.
Figure 6:
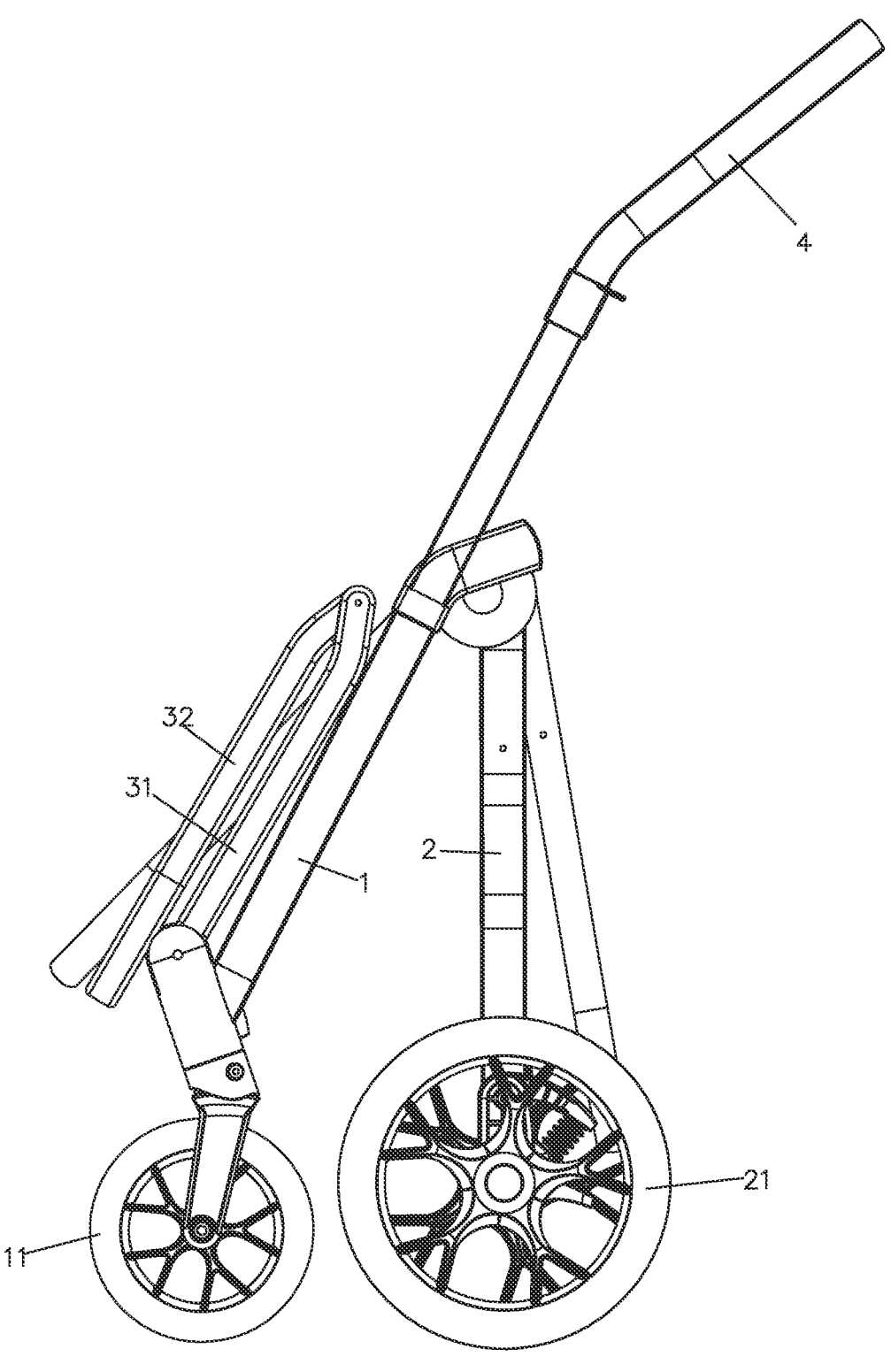
FIG. 6 is a side view of Embodiment 1 in the folded state.

As shown in FIGS. 4 and 5, the rear side of the lower supporting frame is rotatably connected with a storage rack 5 that can be rotatably unfolded or rotatably folded relative to the rear leg 2 and used for storing items, the storage rack 5 includes a U-shaped storage rod 51, and the two connecting ends of the storage rod 51 are each provided with a storage linkage 52 between the storage rod 51 and the lower supporting frame, the upper end of the storage linkage 52 is rotatably connected to the lower supporting frame, and the lower end of the storage linkage 52 is rotatably connected to the connecting end of the storage rod 51, the rear part of the storage rod 51 is provided with a support linkage 53, and the lower end of the support linkage 53 is connected to a roller set 531. As shown in FIG. 4, the upper end of the storage linkage 52 of this embodiment is rotatably connected to a foot lever located between the two rear legs 2. When the storage rack 5 is unfolded, the user pulls the storage rod 51 toward the rear of the rear leg 2, and the storage rod 51 drives the storage linkage 52 to rotate backward and downward relative to the rear leg 2 about the axis of rotation located between the storage linkage 52 and the foot lever so that the upper surface of the storage rod 51 is parallel to the upper surface of the upper frame, and the lower end of the roller set 531 is in the same plane as the lower end of the rear wheel set 21. By connecting the roller set 531 to the lower end of the support linkage 53, the load bearing capacity of the storage rack 5 is improved so that more items can be stored.

Embodiment 2

As shown in FIGS. 7-15, a lower supporting frame and an upper frame of the stroller frame of this embodiment are connected to each other through a frame joint, the lower supporting frame comprises a front leg 1 for connecting the front wheel set 11 and a rear leg 2 for connecting the rear wheel set 21, the front leg 1 is provided with a front leg sliding member 12 capable of sliding along the front leg 1, and an unlock/lock mechanism 6 is provided between the front leg sliding member 12 and the front leg 1 for locking or unlocking the front leg sliding member 12 relative to the front leg bar 1; a push/pull rod assembly 7 is rotatably connected to the front leg sliding member 12 so that the push/pull rod assembly 7 can be rotated backward or forward relative to the stroller frame, thereby enabling the push/pull rod assembly 7 to be switched between an upper push configuration and a lower pull configuration for use. In addition, the push/pull rod assembly is rotatably connected to the front leg sliding member so that the front leg sliding member is slidably adjustable on the front leg; in use, the user can adjust the front leg sliding member to slide axially along the front leg to adjust the height of the push/pull rod assembly relative to the stroller frame, thereby making the push/pull rod assembly suitable for users of different heights in the upper push configuration, which is convenient for the user to push for walking with a good comfort experience. Moreover, the design structure of the push/pull rod assembly has the characteristics of simple structure, convenient operation, and small volume when folded.

Figure 7:
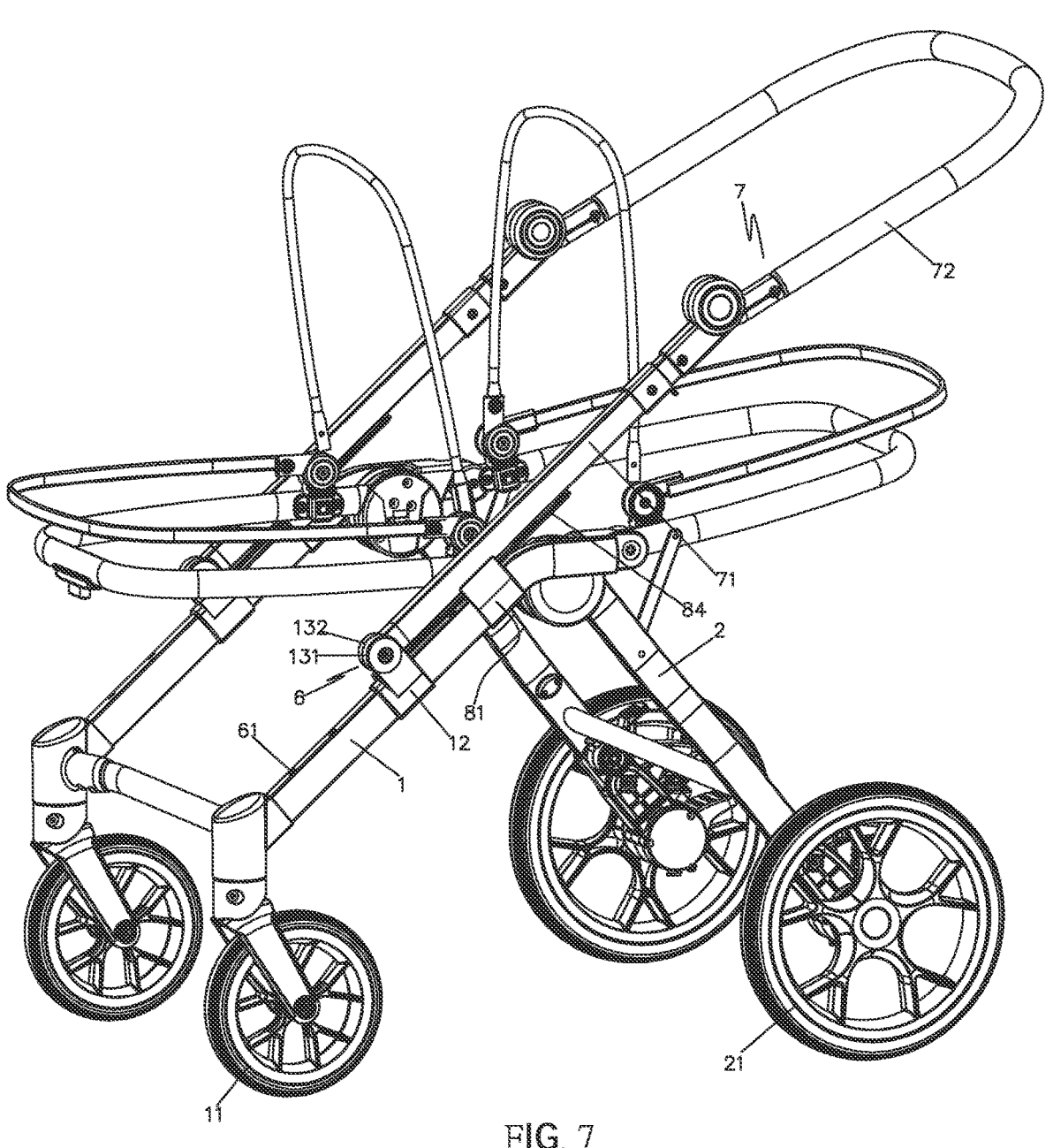
FIG. 7 is a three-dimensional view of the push/pull rod assembly of Embodiment 2 in an upper push configuration.
Figure 14:
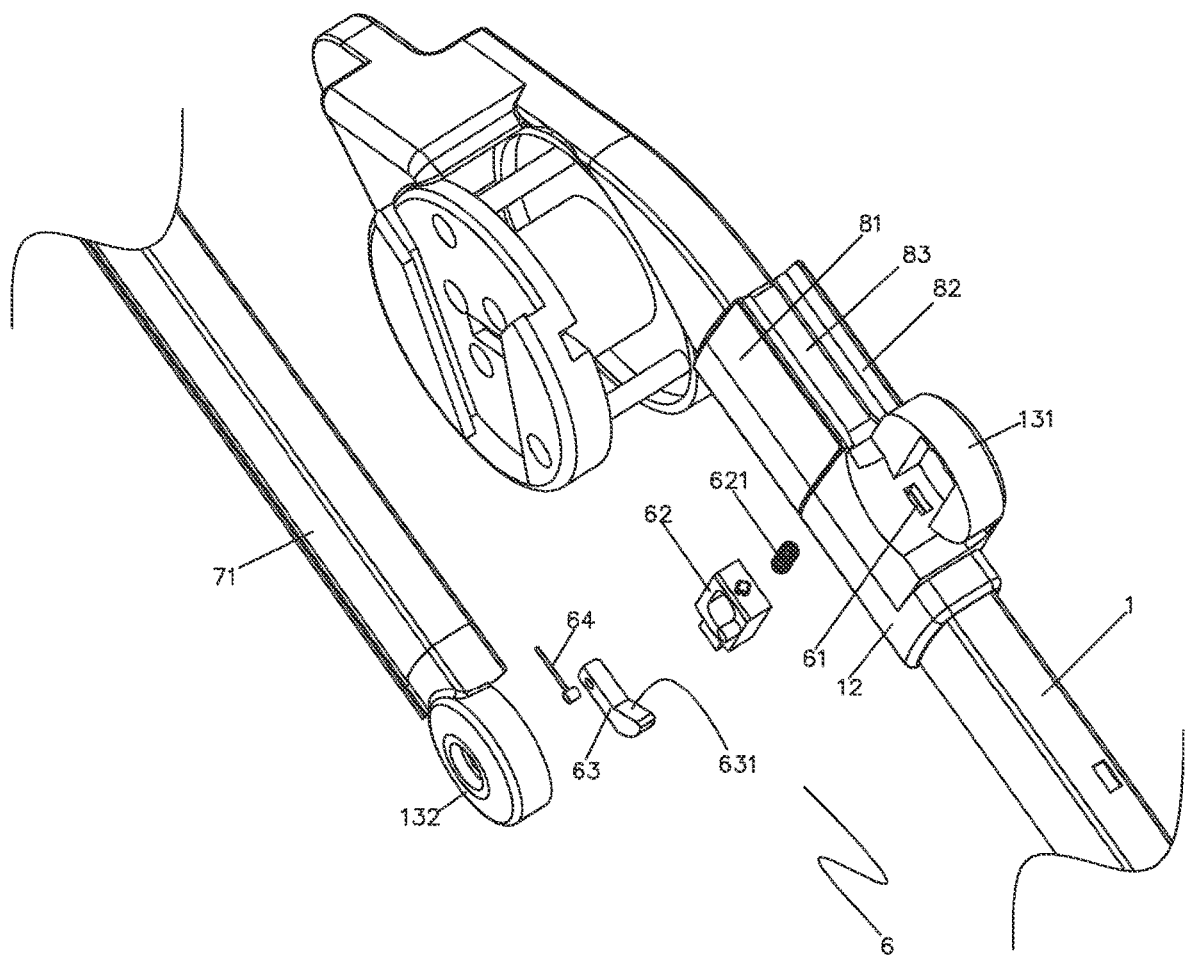
FIG. 14 is an exploded view of the unlock/locking mechanism of Embodiment 2.

As shown in FIGS. 7 and 14, the front leg sliding member 12 is a front leg sliding sleeve disposed on the front leg 1, and the front leg sliding member 12 is rotatably connected to the push/pull rod assembly 7 through a push rod joint 13 including a first joint block 131 disposed on the front leg sliding member 12 and a second joint block 132 disposed on the push/pull rod assembly 7 rotatably connected to the first joint block 131. Between the first joint block 131 and the second joint block 132, a damping member or a joint locking structure is provided which prevents the push/pull rod assembly 7 from rotating relative to the front leg sliding member 12, so as to ensure the fixed positioning of the push/pull rod assembly relative to the stroller frame in the upper push configuration or the lower pull configuration and to facilitate the user to pull or push the stroller frame by the push/pull rod assembly. The joint locking structure is a conventional technology structure in which the damping member may be a rubber, silicone, torsion spring, etc., wherein the damping member undergoes elastic deformation and plays a damping role during rotation of the second joint block 132 relative to the first joint block 131.

As shown in FIGS. 7 and 14, in order to make the unlocking and adjusting more convenient, the unlock/lock mechanism 6 comprises a plurality of locking holes 61 spaced apart on the front leg 1 and a locking block 62 slidably disposed in the first joint block 131, the locking end of the locking block 62 penetrating the front leg sliding member 12 and being insertable into the corresponding locking hole 61 to lock the front leg sliding member 12, and a locking resilient member 621 is provided between the locking block 62 and the first joint block 131 to retain the locking end of the locking block 62 inserted into the locking hole 61; the unlock/lock mechanism 6 further comprises an unlocking member movably disposed on the push/pull rod assembly 7 and an unlocking slider 63 slidably disposed in the second joint block 132 and connected to the unlocking member by an unlocking cord 64, the unlocking slider 63 being provided with an unlocking ramp 631 for driving the locking end of the locking block 62 out of the locking hole 61 when the unlocking slider 63 slides relative to the first joint block 131 to release the locking state of the front leg sliding member 12. During adjustment, the user drives the unlocking slider to slide relative to the second joint block through the unlocking cord by acting on the unlocking member, and the unlocking ramp pushes the locking block to slide away from one side of the front leg so that the locking end of the locking block exits the locking hole and unlocks the front leg sliding member, then the user operates the push/pull rod assembly to drive the front leg sliding member to slide along the front leg to adjust the height of the push/pull rod assembly relative to the stroller frame, and when the push/pull rod assembly is adjusted to the desired position, the user withdraws the force on the unlocking member and the unlocking ramp, also withdraws the force on the locking block, and at that moment the locking block slides toward the front leg under the action of the resilient restoring force of the resilient restoration member so that the locking end of the locking block is inserted into the corresponding locking hole, and the front leg sliding member is locked relative to the front leg.

Figure 8:
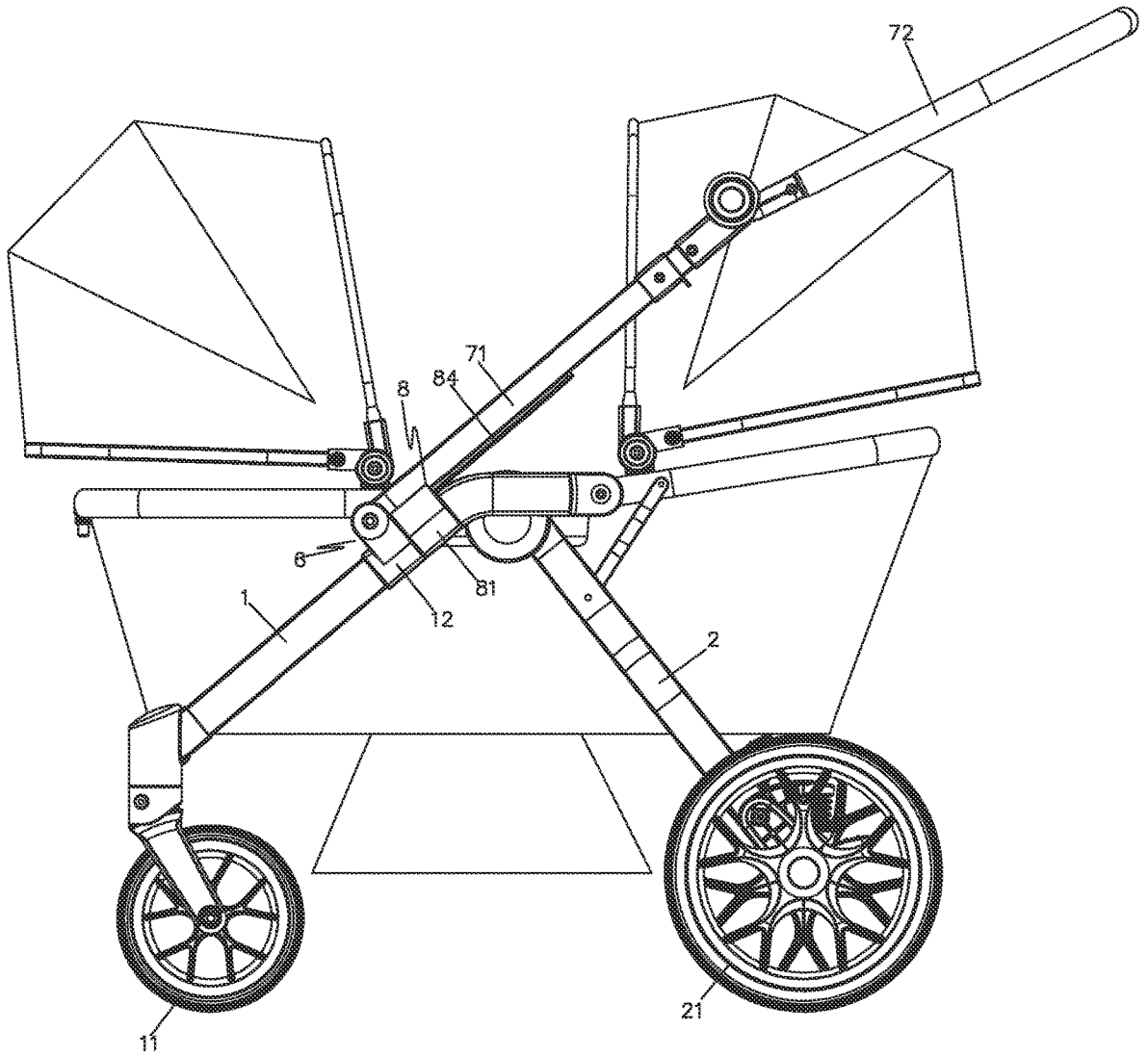
FIG. 8 is a side view of the push/pull rod assembly of Embodiment 2 in the upper push configuration.
Figure 9:
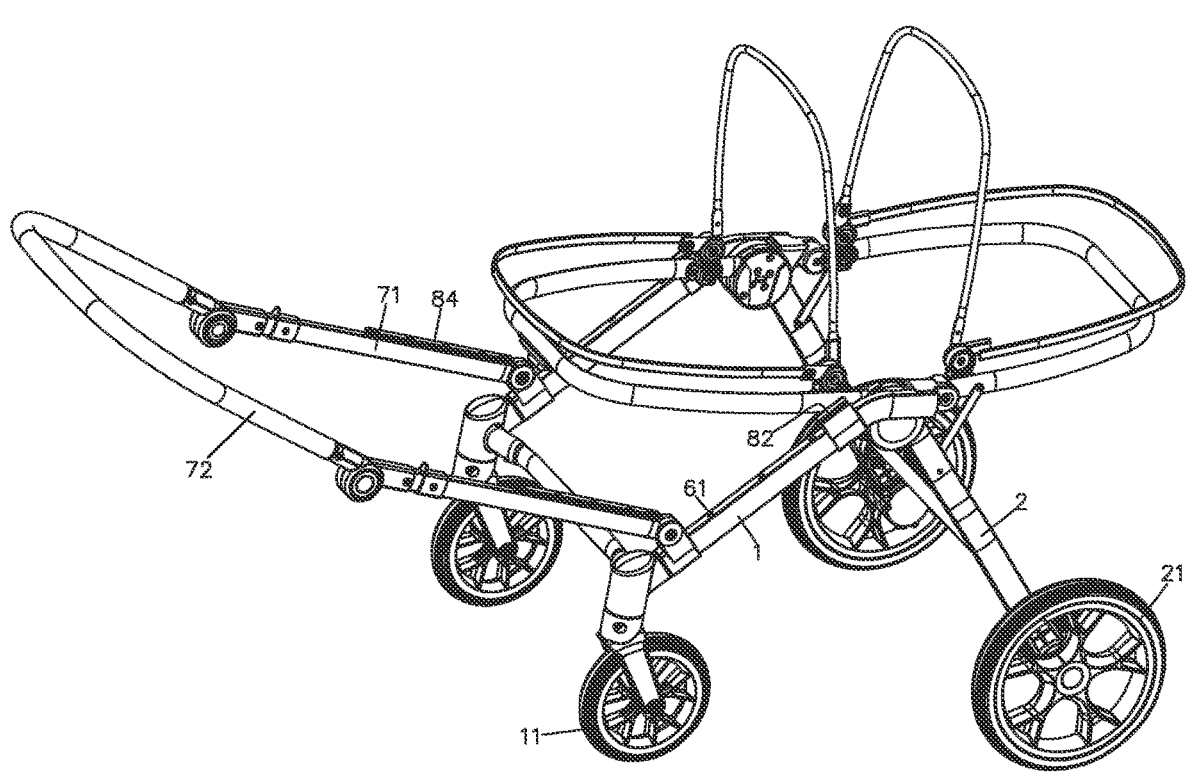
FIG. 9 is a three-dimensional view of the push/pull rod assembly of Embodiment 2 in a lower pull configuration.
Figure 10:
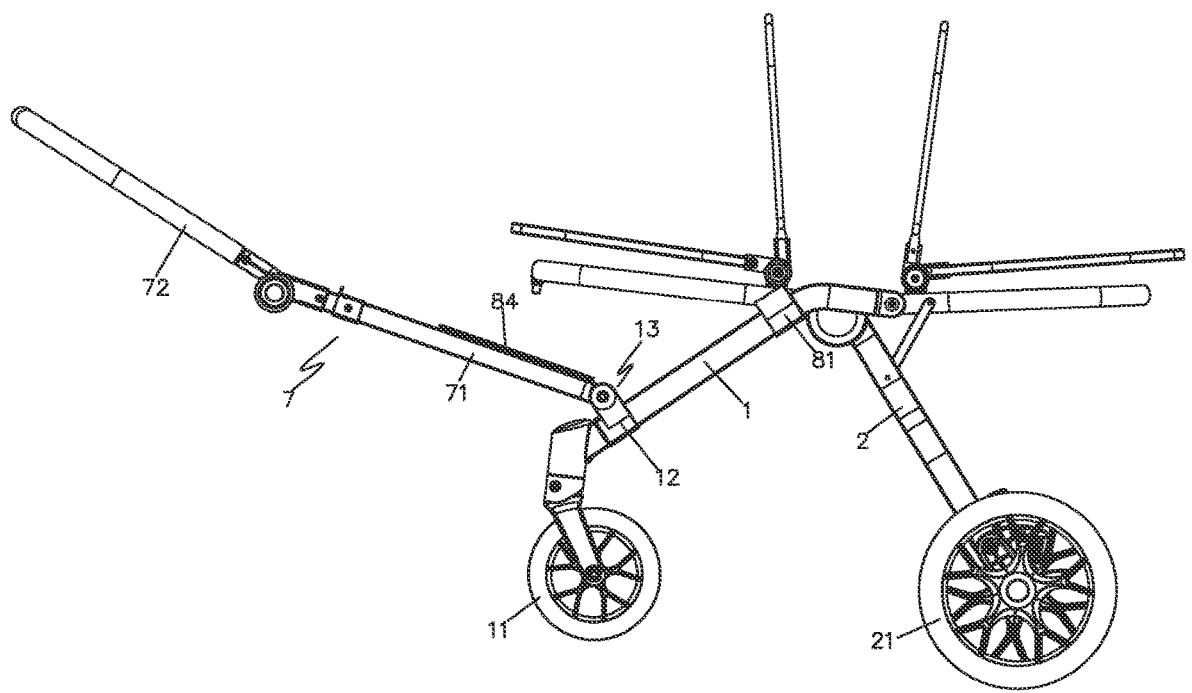
FIG. 10 is a side view of the push/pull rod assembly of Embodiment 2 in the lower pull configuration.
Figure 11:
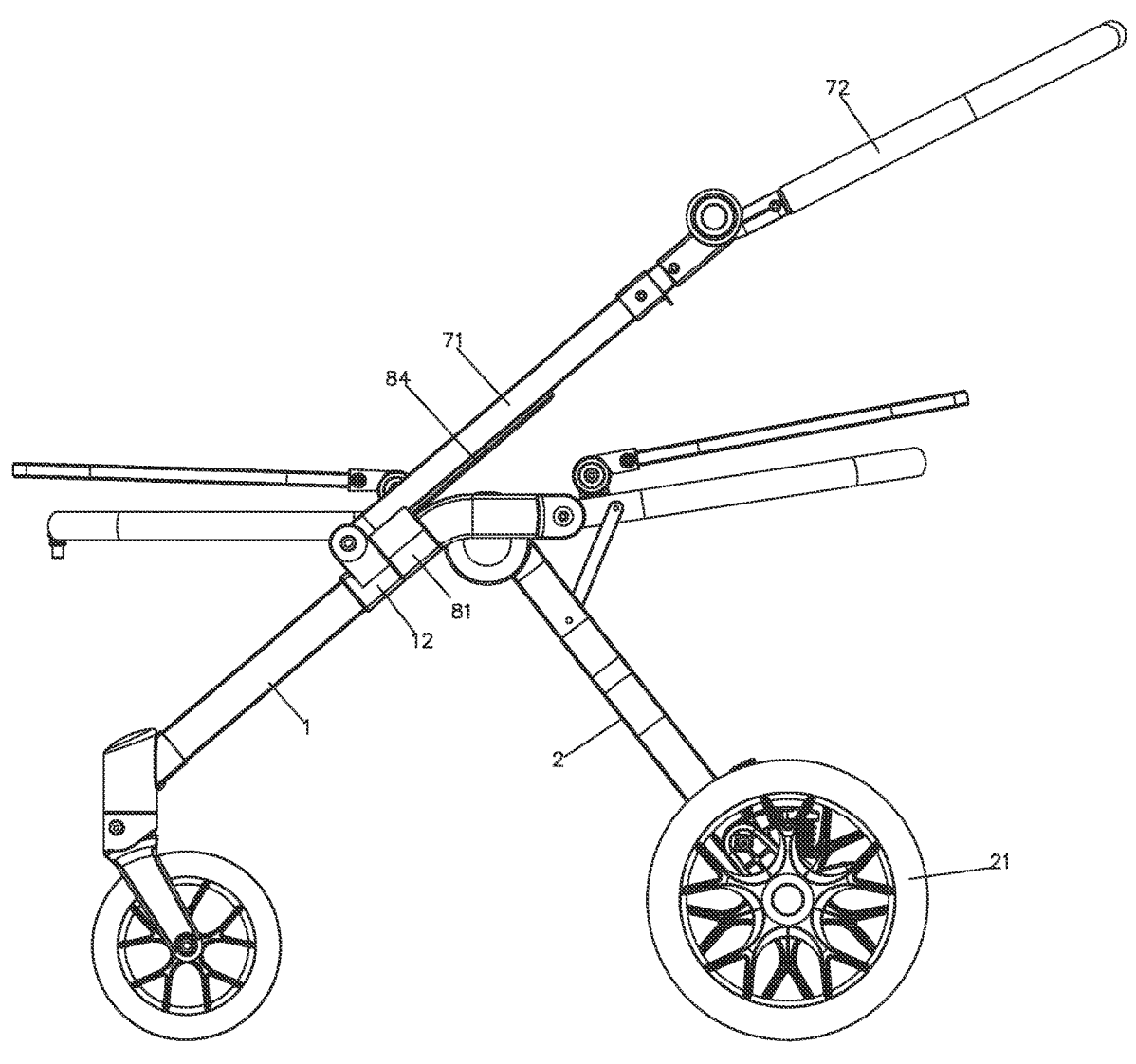
FIG. 11 is a schematic view of Embodiment 2 in an unfolded state.
Figure 12:
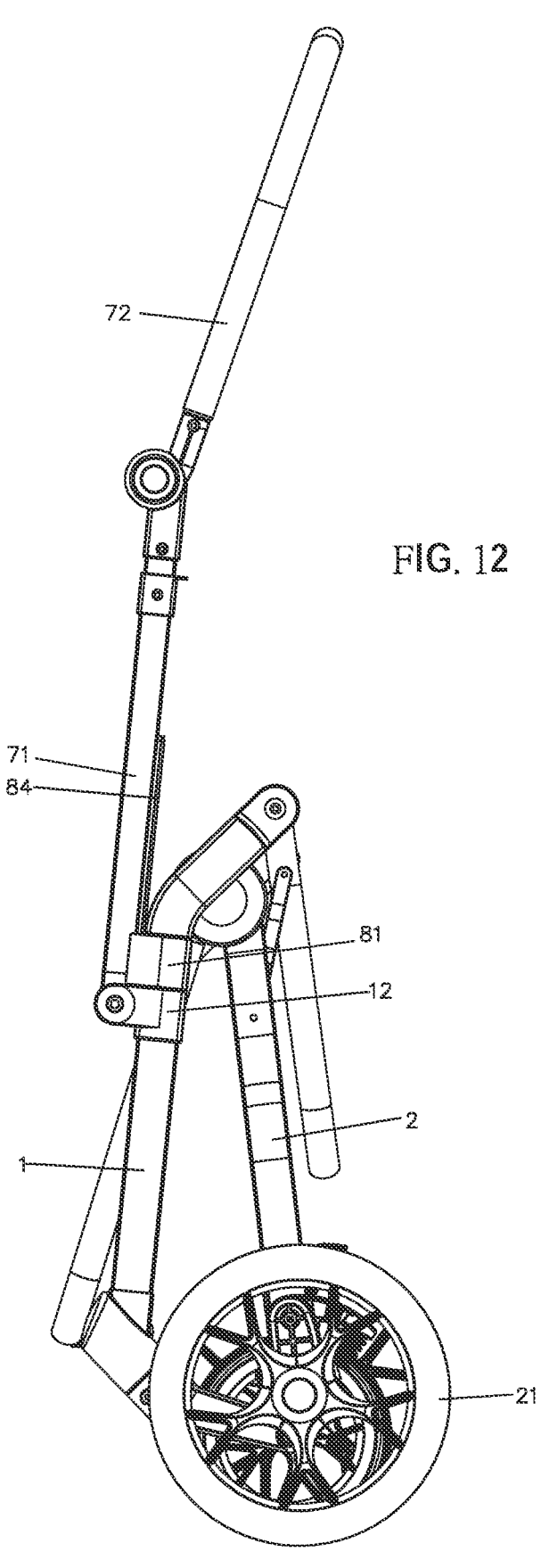
FIG. 12 is a schematic view of Embodiment 2 in a folding process.
Figure 13:
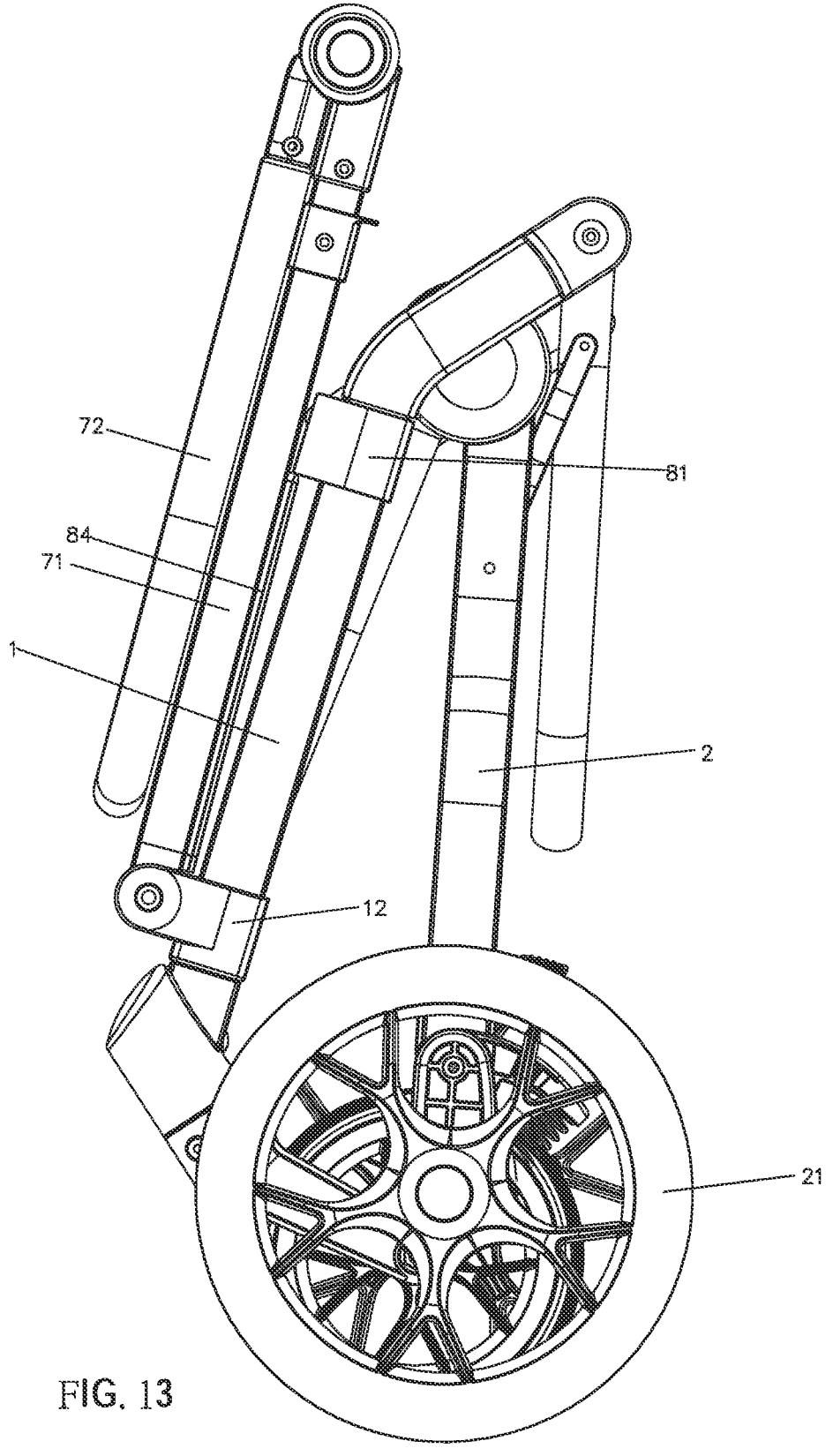
FIG. 13 is a schematic view of Embodiment 2 in the folded state.
Figure 15:
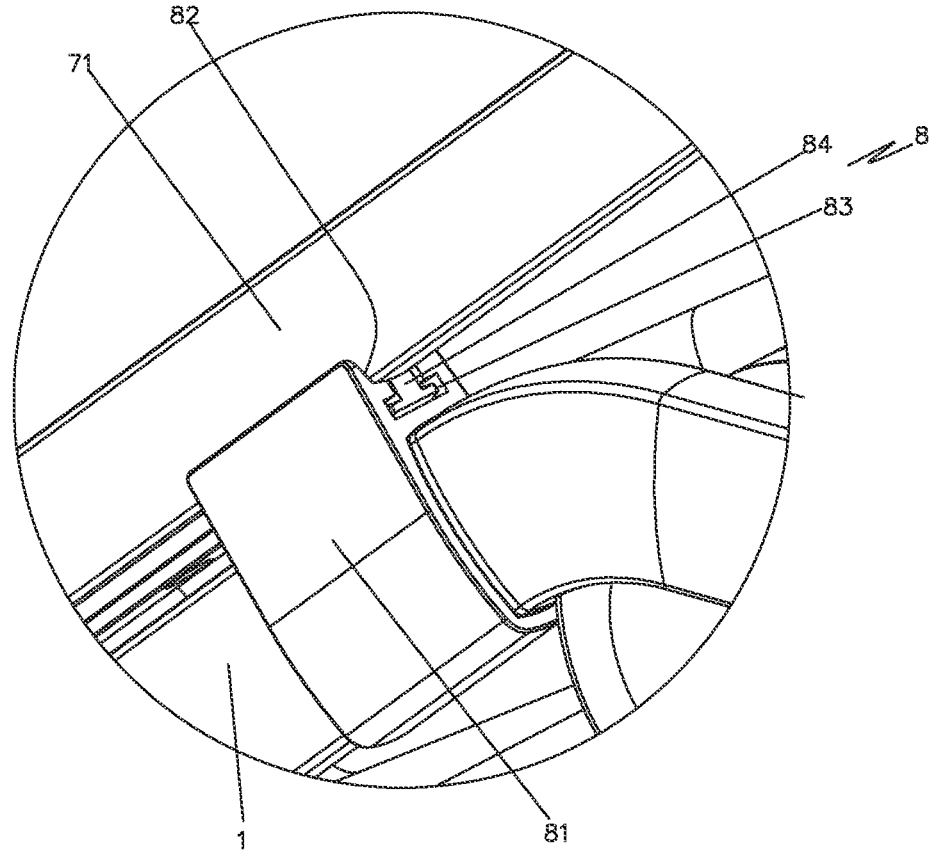
FIG. 15 is a schematic view of the structure of the push rod locking mechanism of Embodiment 2.

As shown in FIGS. 7, 8 and 15, the front leg 1 is provided with a push rod locking mechanism 8 for locking the push/pull rod assembly 7 in the upper push configuration, which comprises a push rod locking seat 81 disposed on the front leg 1, and the push rod locking seat 81 is provided with a push rod locking slot 82 for the push/pull rod assembly 7 to snap into when it is in the upper push configuration. When the snap portion of the push/pull rod assembly 7 is snapped into the push rod locking slot, the lower push rod 71 of the push/pull rod assembly 7 is parallel to the front leg 1 so that it is convenient for the user to push the stroller frame forward by the push/pull rod assembly 7 in the upper push configuration, which has the characteristics of reliability, stability, and labor saving.

The push rod locking mechanism 8 also comprises a T-shaped slider 84 disposed on the push/pull rod assembly 7 and a T-shaped groove 83 disposed on the push rod locking seat 81 and located on the inside of the push rod locking slot 82, the T-shaped groove 83 slides with the T-shaped slider 84, and when the front leg sliding member 12 slides to the side of front leg 1 near the front wheel set 11, the T-shaped slider 84 exits the T-shaped groove 83, which can prevent the push/pull rod assembly from rotating and unfolding relative to the front leg, and at the same time can make the push/pull rod assembly slide more stably and smoothly relative to the front leg, which in turn facilitates the front leg sliding member to slide stably and smoothly after unlocking.

As another specific embodiment of the push rod locking mechanism 8, it comprises a push rod locking seat 81 disposed on the front leg 1, a T-shaped slider 84 disposed on the push/pull rod assembly 7, and a T-shaped groove 83 disposed on the push rod locking seat 81 which is used to slide with the T-shaped slider 84, when the front leg sliding member 12 slides to the side of the front leg 1 near the front wheel set 11, the T-shaped slider 84 exits the T-shaped groove 83.

As shown in FIGS. 7-13, in order to make the present invention more compact and smaller when folded for easy storage and transportation, the push/pull rod assembly 7 comprises a lower push rod 71 having its lower end fixedly connected to the second joint block 132, and an upper push rod 72 having its lower end rotatably connected to the upper end of the lower push rod 71 and capable of rotating to unfold or rotating to fold relative to the lower push rod 71; a push rod locking structure is provided between the upper push rod 72 and the lower push rod 71 for locking the upper push rod 72 relative to the lower push rod 71 when the upper push rod 72 is in the unfolded state. When the upper push rod 72 is rotated and folded relative to the lower push rod 71, the upper push rod 72 is rotated and folded relative to the stroller frame around the axis of rotation located between the lower end of the upper push rod 72 and the upper end of the lower push rod 71, so as to avoid interference between the push/pull rod assembly 7 and the lower supporting frame during the folding process and to make it more convenient to fold.

What is claimed is:

1. A stroller frame having a push-pull function, comprising:

an upper frame;

a lower supporting frame, the lower supporting frame and the upper frame being connected to each other through a frame joint, said lower supporting frame comprising a front leg (1) for connecting a front wheel set (11) and a rear leg (2) for connecting a rear wheel set (21), the front leg (1) being provided with a front leg sliding member (12) capable of sliding along the front leg (1), and an unlock/lock mechanism (6) is provided between the front leg sliding member (12) and the front leg (1) for locking or unlocking the front leg sliding member (12) relative to the front leg (1); and a push/pull rod assembly (7) being pivotally connected to the front leg sliding member (12) to enable the push/pull rod assembly (7) to be rotated backward or forward relative to the stroller frame, thereby enabling the push/pull rod assembly (7) to be used in an upper push configuration or a lower pull configuration;

wherein said front leg sliding member (12) is a front leg sliding sleeve disposed on the front leg (1), said front leg sliding member (12) is rotatably connected to the push/pull rod assembly (7) through a push rod joint (13), said push rod joint (13) comprising a first joint block (131) disposed on the front leg sliding member (12) and a second joint block (132) disposed on the push/pull rod assembly (7) and rotatably connected to the first joint block (131);

wherein said unlock/lock mechanism (6) comprises a plurality of locking holes (61) spaced apart on the front leg (1) and a locking block (62) slidably disposed in the first joint block (131) having a locking end penetrating the front leg sliding member (12) and capable of being inserted into the corresponding locking hole (61) to lock the front leg sliding member (12), with a locking resilient member (621) between said locking block (62) and the first joint block (131) capable of retaining the locking end of the locking block (62) in the locking hole (61); said unlock/lock mechanism also comprises an unlocking member movably disposed on the push/pull rod assembly (7) and an unlocking slider (63) slidably disposed in the second joint block (132) and connected to the unlocking member by an unlocking cord (64); said unlocking slider (63) being provided with an unlocking ramp (631) for driving the locking end of the locking block (62) out of the locking hole (61) when the unlocking slider (63) slides relative to the first joint block (131) to release a locking state of the front leg sliding member (12).

2. A stroller frame having a push-pull function, comprising:

an upper frame;

a lower supporting frame, the lower supporting frame and the upper frame being connected to each other through a frame joint, said lower supporting frame comprising a front leg (1) for connecting a front wheel set (11) and a rear leg (2) for connecting a rear wheel set (21), the front leg (1) being provided with a front leg sliding member (12) capable of sliding along the front leg (1), and an unlock/lock mechanism (6) is provided between the front leg sliding member (12) and the front leg (1) for locking or unlocking the front leg sliding member (12) relative to the front leg (1); and a push/pull rod assembly (7) being pivotally connected to the front leg sliding member (12) to enable the push/pull rod assembly (7) to be rotated backward or forward relative to the stroller frame, thereby enabling the push/pull rod assembly (7) to be used in an upper push configuration or a lower pull configuration;

wherein said front leg (1) is provided with a push rod locking mechanism (8) for releasably locking the push/pull bar assembly (7) in the upper push configuration;

wherein said push rod locking mechanism (8) includes a push rod locking seat (81) disposed on the front leg (1); said push rod locking mechanism (8) comprises a T-shaped slider (84) disposed on the push/pull rod assembly (7) and a T-shaped groove (83) disposed on the push rod locking seat (81) for sliding with the T-shaped slider (84), and said T-shaped slider (84) exits the T-shaped groove (83) when said front leg sliding member (12) slides to a side of the front leg (1) near the front wheel set (11).

3. The stroller frame having a push-pull function according to claim 2, wherein said push rod locking seat (81) is provided with a push rod locking slot (82) for the push/pull rod assembly (7) to snap into when the push/pull rod assembly (7) is in the upper push configuration.

\* \* \* \* \*